Patented Dec. 23, 1952

2,623,028

UNITED STATES PATENT OFFICE 2,623,028

METHOD OF COLORING AMINE ALDEHYDE RESIN MOLDING COMPOSITIONS

Burton Love, Toledo, Ohio, assignor to Libbey-Owens-Ford Glass Company, Toledo, Ohio, a corporation of Ohio No Drawing. Application November 14, 1950, Serial No. 195,699

4 Claims. (Cl. 260—39)

This invention relates to commercial molding compositions and, more particularly, to the preparation of amine-aldehyde molding compositions.

There are certain basic steps involved ordinarily in the preparation of any amine-aldehyde molding compositions, namely, (1) condensation of an amine and an aldehyde to the desired extent usually in aqueous solution; (2) admixture of the condensate with a filler and other additives such as pigments, catalysts, plasticizers and lubricants; and (3) treatment of the mixed materials to obtain a dry, granular material of uniform composition. The precise procedure involved in carrying out the steps may be varied to suit particular circumstances.

The condensation reaction between the amine and the aldehyde if carried to completion results in the formation of an infusible resin. In the preparation of a molding composition, the condensation is carried to an intermediate stage in a solvent medium which facilitates the condensation reaction, and then the condensation is stopped, usually by a drying process in which the solvent is removed. It is absolutely necessary that the extent of condensation of the amine-aldehyde in the molding composition be uniform; unless uniform condensation is obtained, it is not possible to obtain uniform conversion of the composition to infusible form during molding, and the articles molded from the composition contain very noticeable flaws and are wholly unsuitable from the consumer's point of view. Carrying out uniform, controlled condensation of an amine and an aldehyde in, for example, an aqueous solution is a relatively simple matter; but condensation continues during the drying of the reaction mixture, and during such drying it is particularly difficult to control not only because of variations in the concentration of the condensate throughout the reaction mixture but also because of the relatively high drying temperatures used. It has been found that by first impregnating a thoroughly shredded filler with a solution of an amine-aldehyde condensate and then drying the impregnated filler in hot air, it is possible to obtain a filler impregnated with uniformly condensed amine-aldehyde resin.

In the preparation of a typical amine-aldehyde composition, such as a urea-formaldehyde molding composition, a thoroughly shredded cellulose filler is impregnated with an aqueous solution of a urea-formaldehyde condensate and the impregnated filler is dried in hot air to yield a coarse granular popcorn-like material, which is called "popcorn" by the workers in the art, because of its appearance. The desired additives are then blended with the popcorn in a milling process in which the popcorn is pulverized or ground to a fine powder. The powder is usually converted subsequently to a granular material to facilitate commercial handling of the material. Other amine-aldehyde molding compositions may be prepared by substantially the same process, although the processes for the preparation of such compositions are perhaps less standardized than those for urea-formaldehyde compositions, which are the most widely used amine-aldehyde compositions.

For years, the industry has used a ball-milling process for grinding the popcorn and blending the additives therewith. Grinding and blending are recognized as separate and distinct unit processes: "grinding" means reducing the particle size of solids with solids, and "blending" means mixing of solids with solids, such as the mixing of popcorn with the required additives. In general there are four categories of grinding based on the particle size of the feed, or the material to be ground, as well as the particle size desired in the final product. These categories are preliminary breaking, secondary crushing, fine pulverizing and colloid milling. The fine pulverizing category relates to the grinding of feed having about ½–¼ inch particle size to obtain a product that may be so small that it passes through about a 200 mesh screen, and this is the type of milling operation involved in the grinding of popcorn. The fine pulverizing of popcorn is accomplished most effectively in a ball mill which comprises a drum horizontally positioned and rotatable about its longitudinal axis, wherein balls are allowed to fall and to revolve freely upon each other while held in the rotating drum containing the popcorn. Ball mills are particularly popular because of their low cost of maintenance, simple construction and ease of operation.

In ordinary operation, the drum of a ball mill is filled to a depth of about ½–⅔ of its diameter with balls. The material in the mill fills the interstices between the balls and part of the free space above. As the mill rotates all of the balls are set in motion, and the charge, comprising the balls and the material, assumes a position on the rising wall of the mill such that the charge has a generally kidney-shaped cross-section. Part of the charge travels along the wall of the drum and the balance churns around inside. A substantial portion of the charge rises along the wall of the drum to the top, cascades back down over the remaining portion and is pulled back into the mass moving along the bottom of the drum. The reduction in particle size is thus accomplished by a combination of abrasion, rubbing and impact at the numerous points of contact of the balls with the wall of the drum or with other balls. In ordinary operation the high impact grinding is the predominant operation; and that operation becomes increasingly effective as the amount of material in the mill charge is reduced. Also, a substantial amount of lateral motion is generated so that none of the feed can escape the grinding action, and the presence of the balls interrupts the centrifugal action to such an extent that ideal blending conditions are created. In fact, it is well-known that ball mills have the unique industrial advantage of being able to carry out grinding and blending processes simultaneously.

Although the term "ball mill" is sometimes used to refer to a specific type of ball mill, namely, that which employs steel or alloy balls and is lined with metallic material such as hard iron or manganese steel, the term "ball mill" is used herein in its generic sense to mean a mill wherein the balls and the lining of the mill consist of any material suitable for use in a milling process. A species of ball mill useful in the preparation of molding compounds, usually called a "pebble mill," is a mill in which flint pebbles or porcelain balls are used as a grinding medium. Since it is particularly desirable to avoid contamination of molding compounds with metallic particles, pebble mills are preferred for use in the preparation of amine-aldehyde molding compounds.

Another advantage of ball milling processes is that they may be carried out by continuous or by batch operations. The fundamental structure for all ball mills is substantially the same, that is, a generally cylindrically-shaped drum, containing balls as a grinding medium, and equipped with trunnions for mounting the drum in a position with its longitudinal axis generally horizontal and with driving means for rotating the drum about its longitudinal axis. A continuous ball mill usually is equipped with openings at the trunnions through which feed may be introduced at one end and product removed at the other end. Also the length of the drum of a continuous mill is usually several times as great as the diameter. On the other hand, the drum of a batch mill may have a diameter substantially the same as its length; and usually the drum is equipped with a hatch through which feed may be introduced, and through which product may be removed after the grinding of the batch.

Grinding processes, in general, may be classified not only as batch or continuous processes, but also as open-circuit or closed-circuit processes. In an open-circuit process, none of the product discharged from a mill is returned to the mill. On the other hand, in a closed-circuit process, the product discharged from the mill is separated into particles of different sizes, for example, by screening, and the insufficiently reduced particles are retained in or recirculated back to the mill to be further reduced. It is recognized that although an open-circuit process may involve an initial low cost of installation, the use of a closed-circuit process is preferable in all large-scale production because of the low cost of operation.

Articles molded from amine-aldehyde molding compositions are noted for their bright, clear colors, and one of the most important considerations in the preparation of such molding compositions is color control. The "pigment" employed to obtain any given color ordinarily consists of a mixture of several coloring materials (or individual pigments). For example, the coloring materials and the amount of each employed (in grams per pound of molding compound) in order to obtain a particular blue urea-formaldehyde molding compound are, as follows:

| Coloring material | Amount (g./lb.) |
| --- | --- |
| Cryptone (zinc sulfide) | 1.3000 |
| Doco Black No. 38 (inorganic black) | 0.0034 |
| Ultramarine blue R. C. (inorganic blue) | 0.0028 |
| Cloissoné Blue (inorganic blue) | 0.5034 |
| Yellow 1 Y-6-63 (inorganic yellow) | 0.0008 |

Incorporation of each of the foregoing materials is essential and the absence of any one can be detected readily by an experienced observer.

Color control involves extremely accurate control of the quantity of pigment employed as well as extremely uniform dispersion or blending of such pigment throughout the composition.

Color control is the principal factor in determining the adequacy of the process by which the additives are blended with the popcorn. Such additives as catalysts, plasticizers and lubricants are dispersed throughout the popcorn much more quickly and easily than a pigment, and slight variations in the quantity or in the uniformity of the blending of the former additives do not cause the obvious defects in the molded articles that such variations in the amount or the blending of a pigment would cause. Thus, the principal object of such a blending process is adequate blending of pigment; for if this is accomplished it follows that the blending of the other additives is also accomplished satisfactorily. Moreover, the same general considerations are known to apply to all of the various pigment combinations employed in the amine-aldehyde molding compound art.

Although it is not apparent to the naked eye, a microscopic examination of a molding powder containing pigment uniformly blended throughout reveals that the blend consists of small particles of popcorn and numerous minute pigment particles which are evenly distributed among the popcorn particles and are several magnitudes smaller than the popcorn particles. (The popcorn particles have an average particle size of about 30-50 microns, whereas the particle size of most of the pigment materials is in the neighborhood of 1 micron.) Although the pigment particles appear under a microscope to be mere pin-points distributed among the popcorn particles, the powder itself or an article molded therefrom appears to the naked eye to have a clear, uniform color. Pigments are available commercially in extremely fine particle size, but many pigment particles tend to form aggregates which must be broken down completely during the blending process, although little or no actual grinding of the pigment particles is believed to take place. In order to obtain a sufficiently uniform blend of pigment and popcorn it is, of course, necessary to grind the popcorn to a powder. To the workers in the art it appeared to be clearly most advantageous to accomplish simultaneously the pigment aggregate breakdown, the popcorn grinding and the blending of popcorn and pigment, since ball milling for a substantial period of time is required to carry out each of such processes alone, and none of such processes is such that it might interfere with the carrying out of any of the other processes.

Heretofore, it was believed by the workers in the art that an open-circuit, one-step, batch ball milling process was the only practical method of grinding the popcorn and blending the additives therewith. This belief was founded on the best knowledge available not only concerning the theoretical considerations involved in all grinding and blending processes but also concerning the particular characteristics of the popcorn and the additives.

Although it is a recognized fact that in large production continuous milling is preferable to batch milling because of the time loss involved in charging and dumping a batch mill, it has been found that it is wholly impractical to use continuous ball milling to accomplish simultaneous grinding of popcorn and blending of pigment therewith. In such a continuous process it is not possible to maintain color control even approaching that required in the amine-aldehyde molding compound industry. This complete inadequacy of continuous milling is believed to arise from a certain characteristic of continuous mills which in most arts is an advantage, namely, the characteristic of passing fines on much more rapidly to the discharge, leaving incompletely ground material relatively free from fines. Pigments have such small particle size that they act as fines in a continuous process, and thereby create an impossible situation for adequate blending since the pigment moves through the continuous mill at a much faster rate than the popcorn. The net result is not only inadequate blending of the pigment in the final product but also substantial variation in the amount of pigment contained in the popcorn which is discharged at different times.

It is apparent that the foregoing difficulty involved in continuous milling prevents its use in either an open-circuit or a closed-circuit process. Also, closed-circuit batch milling is wholly impractical because no blending could be accomplished, the pigment particles being so fine that they would pass through the product screen long before appreciable grinding of the popcorn could be accomplished.

Grinding in a plurality of steps or stages is used to save time and power in certain arts, and is necessary in processes wherein the equipment required to crush the initial feed is of such a type that it cannot reduce the material to the particle size desired in the final product. No such necessity exists in the grinding of popcorn, which involves grinding particles (already reduced to about $\frac{3}{16}$ inch in size) to a product which passes through an 80 mesh screen. Grinding by stages to save time is adaptable to continuous grinding, not to batch grinding which if anything would require a longer overall time with the use of stages, because of the substantial time loss resulting from each charging and discharging of a batch mill. As mentioned hereinbefore, continuous grinding cannot be used in the instant process. The saving in power obtained by polystage grinding is explained by the impact theory of grinding: the optimum ball size being used for each stage so that the maximum impact effect is obtained, and the minimum cushioning effect resulting from the presence of fines is obtained; however, this theory applies only to materials having high grindability, and not to popcorn which has very low grindability and, in fact, is believed to be ground much more by abrasion and shearing forces than by impact because of its fibrous filler content.

The principal object of the invention is to provide an improved method of grinding popcorn and blending additives therewith. More specific objects and advantages are apparent from the description, which discloses and illustrates but is not intended to limit the scope of the invention.

The present invention consists in an improvement in the preparation of an amine-aldehyde (or amide-aldehyde) molding composition from popcorn (i. e., a dried filler impregnated with a heat-convertible amine-aldehyde condensate), which is a process of incorporating pigment therein that comprises the steps of (1) grinding popcorn to a powder and then (2) blending therewith a homogeneous mixture of 0.1–100 parts of pigment blended with 100 parts of popcorn in powder form. The term "powder" is used herein as it is employed in the molding art. In the art, a fine molding powder is a blend of materials reduced to such size that they appear to the naked eye as a powder. The fine molding powders in commercial use are usually of such size that all of the material will pass through an 80 mesh screen and most of the material will pass through a screen of 200 mesh or finer. By "grinding popcorn to a powder" according to the invention is meant grinding popcorn to substantially the same particle size as that of a commercial molding powder.

The present invention is based on the discovery that an unexpected saving of time, on a production basis, can be obtained by carrying out separately the three steps (1) grinding popcorn to a powder; (2) blending pigment with popcorn ground to a powder, and (3) blending the products of (1) and (2), whereas heretofore an open-circuit, one-step batch ball milling process was considered the only practical method of grinding the popcorn and blending additives therewith. Also, the use of the pigment concentrates obtained by carrying out step (2) affords an advantageous method of accurately controlling the color of the final product. As used hereinafter, the term "pigment concentrate" refers to the highly pigmented homogeneous blend of pigment and popcorn obtained by carrying out the foregoing step (2).

The unique character of the invention is best demonstrated by carrying out an ordinary procedure for producing amine-aldehyde molding compositions and, for comparison therewith, a procedure embodying the invention, as follows:

Popcorn is first prepared by holding a solution of 2 mols of urea in formalin (37 per cent aqueous formaldehyde solution) containing 3 mols of formaldehyde at 30° C. and at a pH of about 7 for 6 hours. (As used herein, the terms "per cent" and "parts" means per cent and parts by weight, unless otherwise designated.) The urea-formaldehyde condensation solution so obtained (210 parts) is used to impregnate thoroughly-shredded alpha cellulose fiber (80 parts), and the impregnated material is dried thoroughly in hot air at about 80–90° C. for about 1 hour to yield the popcorn, which is passed through a cutter to reduce the popcorn to a maximum particle size of about $\frac{3}{16}$ inch.

An open-circuit, batch pebble mill is charged with 454 grams of the popcorn so prepared, an amount of pigment equal to 1.2 per cent of the popcorn, and an amount of other additives (consisting of a molding catalyst, a mold lubricant and a plasticizer) equal to about 2 per cent of the popcorn. The pebble mill is a generally cylindrical drum 7 inches in diameter and 10 inches in length, containing about 9 pounds of 1 inch diameter porcelain balls. The mill operates at a speed of about 60 R. P. M. (revolutions per minute). After the charge has been subjected to 12-14 hours of continuous milling, the mill is stopped. The charge is then dumped from the mill and passed through an 80 mesh screen. The screen retains only an insignificant amount of material in the form of flakes and ordinary impurities, which is discarded. The screened charge is a very fine powder (about 75 per cent of which is so fine that it would pass a 270 mesh screen) which is sufficiently uniform blend to be commercially acceptable as a molding composition.

Repeated operation of the batch mill according to the foregoing procedure has established that a period of 12-14 hours is the optimum milling time, since this period is the minimum milling time required to obtain consistently a commercially acceptable blend, and since any additional benefit which might be obtained by more prolonged milling is not significant in view of the additional power and time loss. On the other hand, if a procedure is carried out which is the same as that described in the foregoing paragraph except that the popcorn is preground to a fine powder before it is incorporated in the batch mill charge and the batch milling is discontinued after 5-6 hours instead of after 12-14 hours, it is found that the screened charge is sufficiently uniform to be commercially acceptable.

The coloring materials and amounts of each employed (in grams per pound of molding compound) in order to obtain a particular green urea-formaldehyde molding compound according to the foregoing procedures are as follows:

| Coloring Material | Amount (g./lb.) |
| --- | --- |
| (1) Albalith (lithopone) | 5.000 |
| (2) Hydrated Chromium Oxide (green) | 0.600 |
| (3) Cadmium Sulfide (yellow) | 0.090 |
| (4) Cadmium Lithopone (red) | 0.007 |

Pigment concentrates for each of the foregoing coloring materials are prepared, as follows:

(1) The open-circuit, batch pebble mill hereinbefore described is charged with 408.6 grams of popcorn that is preground to a fine powder and 45.4 grams of Albalith. After the charge has been subjected to one hour of milling, the mill is stopped and dumped to yield a homogeneous blend of 90 parts of popcorn and 10 parts of Albalith, hereinafter referred to as pigment concentrate A.

(2) A procedure is carried out that is the same as that described in the foregoing paragraph (1) except that 449.46 grams of popcorn and 4.54 grams of hydrated chromium oxide are used instead of 408.6 grams of popcorn and 45.4 grams of Albalith, and there is obtained a homogeneous blend of 99 parts of popcorn and 1 part hydrated chromium oxide, hereinafter referred to as pigment concentrate B.

(3) A procedure is carried out that is the same as that described in the foregoing paragraph (2) except that cadmium sulfide is used instead of hydrated chromium oxide, and there is obtained a homogeneous blend of 99 parts of popcorn and 1 part of cadmium sulfide, hereinafter referred to as pigment concentrate C.

(4) A procedure is carried out that is the same as that described in the foregoing paragraph (1) except that 453.546 grams of popcorn and 0.454 gram of cadmium lithopone are used instead of 408.6 grams of popcorn and 45.4 grams of Albalith, and there is obtained a homogeneous blend of 99.9 parts of popcorn and 0.1 part of cadmium lithopone, hereinafter referred to as pigment concentrate D.

A green molding composition is prepared as follows:

The open-circuit, batch pebble mill hereinbefore described is charged with 82.50 grams of popcorn that is preground to a fine powder, 12.5 grams of pigment concentrate A, 15.0 grams of pigment concentrate B, 2.25 grams of pigment concentrate C, 1.75 grams of pigment concentrate D and an amount of other additives (consisting of molding catalyst, a mold lubricant and a plasticizer) equal to about 2 per cent of the popcorn. After the charge has been subjected to 1½ hours of milling, the mill is stopped and dumped to yield a fine powder which is a sufficiently uniform blend to be commercially acceptable as a molding composition.

As hereinbefore mentioned, one of the basic aspects of the present invention resides in the discovery that, contrary to the prevailing belief, simultaneous popcorn grinding, pigment aggregate breakdown and blending of pigment and popcorn is not the best method of preparing pigmented molding compositions; but instead it is much more rapid to carry out each of the procedures separately. The nature of this particular advantage of the invention may be demonstrated by carrying out the following procedure.

Popcorn is prepared by holding a solution of 2 mols of urea in formalin (37 per cent aqueous formaldehyde solution) containing 3 mols of formaldehyde at 30° C. and at a pH of about 7 for 6 hours. The urea-formaldehyde condensation solution so obtained (210 parts) is used to impregnate thoroughly-shredded alpha cellulose fiber (80 parts), and the impregnated material is dried thoroughly in hot air at about 80-90° C. for about 1 hour to yield popcorn, which is passed through a cutter to reduce the popcorn to a maximum particle size of about $\frac{3}{16}$ inch.

The popcorn so prepared is ground to a powder by passing it through an open-circuit, continuous pebble mill. This continuous mill is a generally cylindrical drum 4½ feet in diameter and 30 feet in length, containing about 15,000 pounds of 1¼" diameter porcelain balls (specific gravity: 2.4). The mill operates at a speed of about 29 R. P. M. and is equipped with a water jacket for maintaining the temperature of the charge at about 25° C. during operation of the mill. The powder is discharged from the mill and passed through an 80 mesh screen. The screen retains a very small percentage (i. e., less than 1 per cent) of the product, and the material so retained is discarded. The screened powder has substantially the same screen analysis as a commercial molding powder. The popcorn is passed through the continuous mill at the rate of 1400 pounds per hour and the total amount of popcorn present in the mill during regular operation (i. e., the circulating level) is 1653 pounds, so that the average grinding time for the popcorn is as follows:

$$\frac{\text{circulating level (lbs.)}}{\text{rate (lbs. per hour)}} = \frac{1653}{1400} = 1.18 \text{ hours}$$

The average grinding time so determined is, of course, not limited to any particular quantity of popcorn, but is the minimum length of time that is required for open-circuit continuous milling under the operating conditions described. Thus, it can be seen that a substantial saving in the overall milling time is obtained by the use of the process of the invention. For example, if the batch ball mill hereinbefore described is used to carry out the pigment concentrate preparation and the final molding compound blending according to the invention the overall milling time is as follows:

| continuous milling time | plus | concentrate preparation milling time | plus | final blending time | = | total time |
|---|---|---|---|---|---|---|
| 1.18 hrs. | + | 1 hr. | + | 1.5 | = | 3.58 |

In contrast, the overall milling time for the usual process hereinbefore described in which popcorn grinding and pigment blending are carried out simultaneously has been found to be 12–14 hours, which is about 60 per cent greater than the time of 3.58 hours required in the practice of the invention. The precise reason for the unexpected superiority of the process of the invention is not understood, but a thorough investigation of the process in an effort to explain the unusual results has led to the conclusion that several factors may be instrumental in bringing them about. Experiments, wherein ball milling of popcorn was carried out in a mill equipped with an observation window, have shown that a very substantial change in the properties of the popcorn takes place during the milling operation. At first, the bulk of the popcorn follows substantially the same path as the balls in the mill, rising along the up-going wall of the mill and cascading back down upon the material in the bottom of the mill; but after the popcorn has been reduced approximately to a particle size such that it can pass through a 20–30 mesh screen, the popcorn appears in the milling operation to acquire fluid-like properties and assumes a more or less level position in the bottom of the drum, although the balls continue to pass through the fluid-like material, rising along the up-going wall and cascading down. Since the process of the invention demonstrates that the steps of pigment aggregate breakdown and blending of pigment concentrate with popcorn (powder) can be accomplished in about 2½ hours, it would seem that it should be possible to complete the blending of the pigment at least by the time the grinding of the popcorn is completed; but, instead, grinding, blending and pigment aggregate breakdown cannot be accomplished simultaneously as satisfactorily as they are accomplished successively in the process of the invention even when the milling operation is carried out for a period of time more than three times as great as that employed in the process of the invention.

One explanation that can be offered is that popcorn in powder form is bifunctional in that it accomplishes very quickly the initial pigment aggregate breakdown during the preparation of the pigment concentrate and it also assists noticeably in "carrying" the pigment throughout the entire mass of preground popcorn during the final blending of the molding composition, particularly because the mass is subjected to high impact forces during such blending. Another explanation that can be offered for the unusual results obtained in the present process is that in the prior process some irreversible damage was done during the early stages of milling, while the popcorn was not in powder form, perhaps by entrapment of pigment particles in the fibrous filler so that they were not readily released. During grinding, the apparent specific gravity of popcorn is increased, and the popcorn is reduced from a fluffy, fibrous material to a powder-like material when it is reduced to such a particle size that it can pass through a 20–30 mesh screen (the popcorn appears to the naked eye to remain in this form even though subjected to further grinding). It is a critical feature of the invention that the popcorn must be ground at least to such a powder-like form before final blending with the pigment concentrate, in order to avoid the irreversible damage hereinbefore mentioned. Thus, although the unusual advantages of the instant invention are not based on the grinding of popcorn in several stages, it is an additional advantage of the invention that the preliminary popcorn grinding may be used to reduce the popcorn to a powder of maximum particle size (i. e., about the particle size that passes through a 20–30 mesh screen) and a batch milling operation wherein pigment blending is accomplished may be used also to complete the reduction of the popcorn to the desired final particle size.

Different operating conditions might be used in the practice of the invention to accomplish the desired grinding in substantially less time, however; and it is an important advantage of the present invention that the preliminary grinding of the popcorn need not take place in an open-circuit batch mill, but may be carried out in a continuous mill.

Closed-circuit continuous grinding is ordinarily recommended as a more economical operation than open-circuit continuous grinding, but in the practice of the instant invention open-circuit continuous grinding has been found to produce a popcorn powder that can be blended with pigment to obtain a molding composition that yields more homogeneous molded articles. One explanation that might be advanced for the better results obtained by open-circuit grinding is that it is possible to screen out any impurities (on the 80 mesh screen hereinbefore described) in an open-circuit process, whereas in a closed-circuit process any material which does not pass through the product screen is recirculated. However, the amount of actual impurities present is so small that the removal of impurities is insufficient alone to account for the improvement in the product. It is believed that another fact may be very important, namely, that a small portion of the amine-aldehyde may have been condensed either too far or not far enough. The over-condensed or under-condensed portion is probably very small, but it could be responsible for the unexpectedly superior results of the invention, for any one of several reasons, since the improperly condensed portion would be difficult to grind. A small proportion of such material in a batch process would prolong the milling time for the overall process, but in a continuous process such proportion would require a more prolonged grinding time for itself but would not affect the average grinding time. On the other hand, in an open-circuit continuous grinding process such material would pass through the mill and be discarded, and in that manner any heretofore unappreciated defects in the final molded article which might have been caused by lack of uniform condensation would be completely avoided.

The present invention may be used advantageously in the preparation of any amine-aldehyde molding composition. In the preparation of such a composition an aldehyde may be condensed with any substance whose molecule has a plurality of NH₂ groups, for example, a substance whose molecule has a plurality of NH₂ groups each connected to a carbon atom which in turn is connected by a double bond to a nitrogen or oxygen atom, which may be (1) a substance whose molecule has a plurality of NH₂ groups, each attached to a carbon atom contained in a linear chain, which in turn is connected by a double bond to a nitrogen or oxygen atom, or (2) a substance whose molecule has a plurality of NH₂ groups, each attached to a carbon atom contained in a ring, which in turn is connected by a double bond to a nitrogen or oxygen atom.

A substance (1) which reacts with an aldehyde to form a resinous reaction product that can be molded to form a plastic article may be (a) a substance whose molecule has a plurality of NH₂ groups each connected to a carbon atom that is connected by a double bond to an oxygen atom, e. g., urea,

biuret,

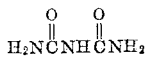

a polyamide such as tartramide,

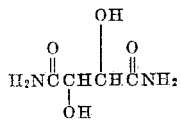

maleamide,

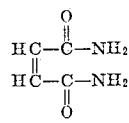

or phenyliminodiacetamide

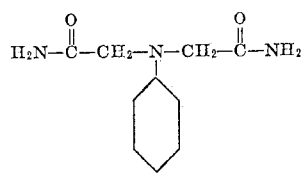

a diureido alkane, e. g., ethylene diurea,

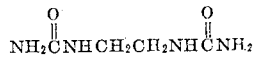

or 1,2-propylene diurea,

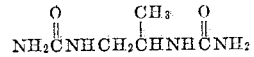

a di-ureidoalkyl ether such as beta, beta′-di-ureidoethylether,

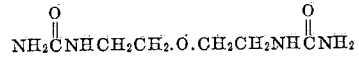

or gamma, gamma′-diureidopropyl ether,

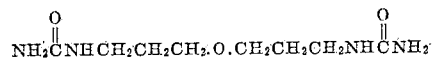

a di-ureidoalkylpolyether such as triethylene glycol diurea,

an aliphatic polyamide having urea-end groups; a mono- or polyhydroxy derivative of any of the above-mentioned di-ureido compounds in which each hydroxy group is attached to a carbon atom to which no urea group is attached, such as 2-hydroxy trimethylene diurea,

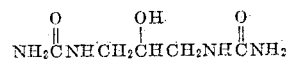

a diurethane such as diethylene glycol dicarbamate,

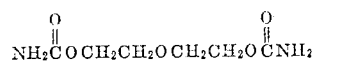

or triethylene glycol dicarbamate,

or a triurea such as diethylene triurea

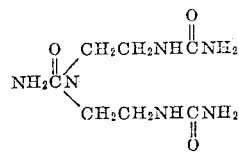

or (b) a substance in which there is not more than one NH₂ group connected to each carbon atom which in turn is connected by a double bond to a nitrogen atom, e. g, biguanide,

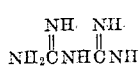

or dicyandiamidine,

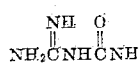

A substance (2) which reacts with an aldehyde to form a resinous reaction product that can be molded to form a plastic article may be (a) a substance whose molecule has a plurality of NH₂ groups each attached to a triazole ring, such as guanazole,

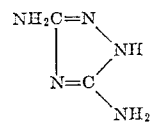

1-phenyl guanazole,

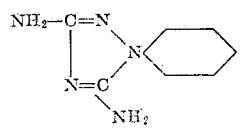

4-aminoguanazole

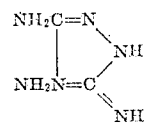

1-carbamyl guanazole,

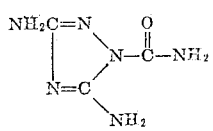

1-guanyl guanazole,

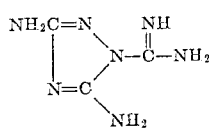

1-acetyl guanazole,

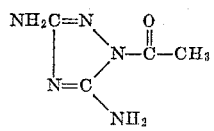

or 1-benzoyl guanazole

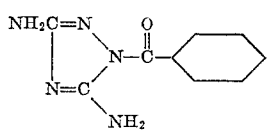

(b) a substance whose molecule contains a plurality of NH₂ groups each attached to a diazine ring, e. g., a pyrimidine such as 2,4-diamino-6-hydroxy pyrimidine,

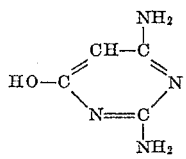

or a quinazoline such as 2,4-diaminoquinazoline,

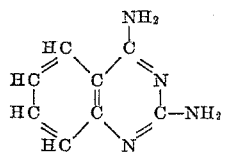

or (c) a substance whose molecule contains a plurality of NH₂ groups each attached to a triazine ring, e. g., a diamino triazine (i. e., a guanamine) such as acetoguanamine,

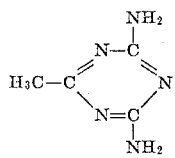

benzoguanamine,

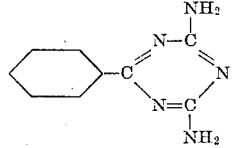

or formoguanamine,

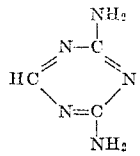

triamino triazine (i. e., melamine),

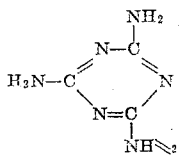

or a diguanamine, such as gamma-methyl-gamma-acetyl pimeloguanamine,

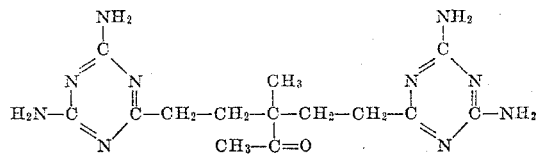

sebacoguanamine,

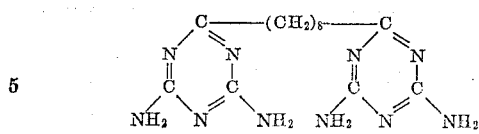

adipoguanamine,

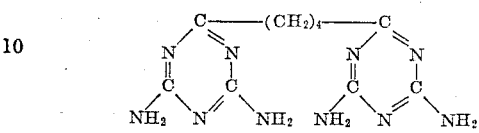

bis-(4,6-diamino-2-triazinyl-ethyl) fluorene,

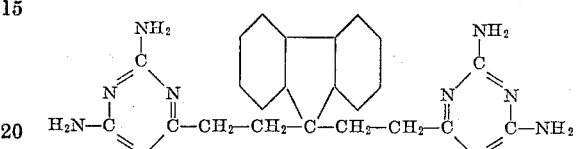

gamma-isopropenyl-gamma-acetyl pimeloguanamine,

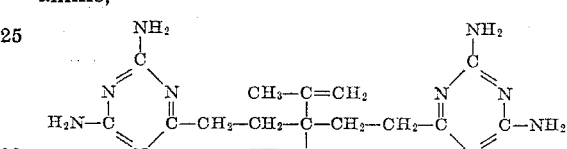

diphenyladipoguanamine,

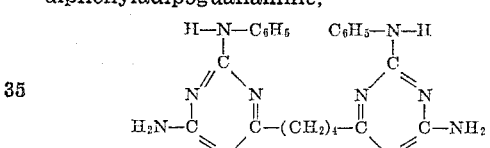

diphenylsebacoguanamine, di-p-phenetyladipoguanamine, or di-o-tolyladipoguanamine.

The first five diguanamines hereinbefore mentioned may be considered to be derivatives of dicarboxylic acids. Such diguanamines, as well as other diguanamines in which the exocyclic nitrogen atoms are unsubstituted may be produced by condensing with dicyandiamide the dinitrile corresponding to a dicarboxylic acid such as any normal aliphatic dicarboxylic acid in the series from malonic acid to octadecane 1,18-dicarboxylic acid, or fumaric acid, or any benzene dicarboxylic acid, or any naphthalene dicarboxylic acid, or any cyclohexane dicarboxylic acid, or the dimer of linoleic acid. The condensation of the dinitrile with dicyandamide is carried out by dissolving a strongly basic catalyst in a suitable primary or secondary alcoholic solvent such as benzyl alcohol or ethylene glycol mono-methyl ether, adding the dinitrile and from about 2.2 to about 2.6 moles of dicyandiamide for each mole of the dinitrile, and heating to start the reaction. The reaction is then continued by heating or cooling if necessary to keep the temperature between about 100° and about 180° C. and to prevent the reaction from becoming too violent. The quantity of the alcoholic solvent used should be just sufficient to form a suspension of the precipitate that can be stirred during the reaction. When precipitation of the diguanamine is complete, the precipitate is filtered off and washed with boiling water to remove excess dicyandiamide and products of side reactions. The diguanamine may be purified by converting it to a hydrochloride and neutralizing an aqueous solution of the hydrochloride to liberate the diguanamine.

This method of preparation is versatile in that a large variety of dinitriles may be used for the reaction with dicyandiamide, to give a wide variety of diguanamines.

The dinitriles may be prepared by various methods. Dinitriles in which the cyano groups are separated by five carbon atoms in series, and in which the central carbon atom of the series is disubstituted, may be prepared by condensing acrylonitrile and a compound having an active methylene group, in the presence of a strong base. Other dinitriles may be prepared by reacting a polymethylene dihalide with sodium cyanide. Often it is convenient to prepare the dinitrile by dehydration of the diamide or directly from the dicarboxylic acid.

Diguanamines in which one or two of the exocyclic nitrogen atoms are substituted, as, for example, the last four diguanamines hereinbefore mentioned, may be prepared by various methods. One method consists in reacting 1-phenyl biguanide, 1-o-tolyl biguanide, 1-m-tolyl biguanide, 1-p-tolyl biguanide, 1-(2,5-dimethyl phenyl) biguanide, 1-methyl-1-phenyl biguanide, 1-p-phenetyl biguanide or 1-ethyl-1-phenyl biguanide with sodium carbonate, and adipyl chloride or the dichloride of any other dicarboxylic acid in chlorobenzene. Another method consists in reacting any of the aforementioned aryl or alkyl aryl biguanides, or 1-methyl biguanide, 1-ethyl biguanide, 1-propyl biguanide, 1-butyl biguanide, 1-allyl biguanide, 1-crotyl biguanide, 1,1-dimethyl biguanide, 1,1-diethyl biguanide or 1,1-diallyl biguanide, with the diethyl or dimethyl ester of adipic acid or any other dicarboxylic acid in the presence of an alkoxide catalyst. Still another method consists in reacting an aryl dicyandiamide such as phenyl dicyandiamide with adiponitrile or the dinitrile of any other dicarboxylic acid.

A thermosetting resinous reaction product may be obtained by reacting a substance whose molecule has a plurality of NH2 groups each connected to a carbon atom which in turn is connected by a double bond to a nitrogen or oxygen atom, as hereinbefore defined (or a mixture of such substances), either with formaldehyde or with a polymer thereof, such as paraformaldehyde. When used for this reaction, paraformaldehyde is considered to split up so that the substance actually taking part in the reaction is formaldehyde. The substance whose molecule has a plurality of NH2 groups each connected to a carbon atom which is turn is connected by a double bond to a nitrogen or oxygen atom may be reacted with a solution of formaldehyde in water, in an organic solvent such as an alcohol, or in a liquid containing both water and an organic solvent. The reaction may be performed in an autoclave, if desired, to secure a reaction temperature above the boiling point of the solvent. Such a substance may be added to an ordinary commercial aqueous formaldehyde solution having a pH of 4, or to such a solution which has been made less acid, or neutral, or alkaline, preferably at a pH between 6 and 8, by addition of any desired base, such as sodium hydroxide, ammonium hydroxide, borax, or triethanolamine.

In general, the proportion of formaldehyde actually reacting may range from one-half to a maximum of two molecules for each amino group. An excess of formaldehyde above this maximum may be used for the reaction if desired, although an uncombinable excess of one of the reactants usually is not desirable in the final product. Because of the complexity of the molecules of the reaction products that are produced, the proportion of formaldehyde actually reacting may vary freely between the limits stated. The preferred proportions vary, of course, with the specific substance that is reacted with formaldehyde. For example, when the substance is urea, the preferred proportions are about 3 mols of formaldehyde for every 2 mols of urea, and when the substance is melamine, the preferred proportions are about 3 mols of formaldehyde for each mol of melamine. Other examples of preferred molar ratios of formaldehyde to substances hereinbefore described, in the resinous reaction products that comprise the matrices of plastic articles embodying the invention, and of the molding compositions embodying the invention from which such plastic articles are obtained, are 2:1 for guanazole or 1-carbamyl guanazole, 2:1 for ethylene diurea or propylene diurea, 2.5:1 for diethylene glycol dicarbamate, 4:1 for 2,4-diamino-6-hydroxy pyrimidine, 3:1 for 2,4-diamine quinazoline, 2:1 for formoguanamine, acetoguanamine or benzoguanamine and 5:1 for adipoguanamine or sebacoguanamine.

The reaction proceeds at normal temperatures, but heating ordinarily is desirable to shorten the time of reaction, or, in some cases, to dissolve the substance to be reacted with formaldehyde. A resin solution may be obtained by carrying the reaction only to its earliest stage, for example, the stage at which the reacting ingredients have just dissolved to form a solution, or by carrying the reaction to any further stage (short of the insoluble stage). By advancing the reaction, it is possible to obtain thermosetting resinous reaction products that are insoluble but still fusible. Such reaction products may be converted by heat into infusible resins.

An acid-reacting catalyst may be used in hardening or converting the thermosetting resinous reaction product into an infusible resin in the production of a plastic article. Since the action of such a catalyst is due solely to its acidity, any acid substance, such as an inorganic acid, an organic acid or an acid salt such as ammonium chloride or sulfate, may be used as the catalyst. The degree of acidity employed during the hardening of the resinous reaction product is simply that acidity which causes the resinous reaction product to harden at the desired rate, and all such acid-reacting catalysts are used in the usual catalytic amounts, i. e., from about 0.02 to about 5 per cent by weight of the composition, and usually about 0.1 to 1 per cent by weight of the composition.

A molding composition prepared according to the invention contains a filler. The filler preferably is impregnated with a solution of the amine-aldehyde condensate and then dried. Any of the fillers ordinarily used in commercial molding compositions may be employed. The preferred filler for use in the invention is a fibrous cellulosic material, which may be in the form of wood flour, wood pulp, newsprint, printed newspaper, sawdust, shavings, walnut shell flour or ground corn cobs. It is desirable to use alpha cellulose. The proportion of filler may range from about 20 to about 55 per cent of the composition, the preferred range depending upon the type of filler used and the particular amine-aldehyde condensate employed. Usually the preferred proportion of filler is from about 25 to about 35 per cent of the composition.

In the practice of the invention such additives as plasticizers, opacifiers, lubricants and catalysts may be blended with the popcorn powder in the same operation in which the pigment concentrate is prepared or they may be blended into the final molding composition in the same operation in which the pigment concentrate is blended therewith. Another aspect of the present invention, however, is based on the discovery that certain unusual advantages may be obtained if the foregoing additives are blended into the composition during the blending of the pigment concentrate in the final molding composition. It was observed that prolonged grinding and blending led to a noticeable "greying" of the molding composition, i. e., a greyish tint developed in the molding composition. Such discoloration is very undesirable, but the precise cause of such discoloration was not known heretofore. It has now been discovered that the greying effect is dependent to a very substantial extent upon the length of time that the lubricant is present during the grinding and blending operation. The greying effect is, therefore, caused by the lubricant, although it is not known whether such effect is caused by the lubricant alone or in cooperation with other ingredients present.

In the practice of the invention it is highly advantageous to delay in adding the lubricant until the final blending of the molding compound. Other additives such as plasticizers, opacifiers and catalysts may be added during pigment concentrate preparation without causing any apparent harm. Any of the foregoing additives customarily employed in the preparation of molding compositions may be employed in the process of the invention, and since the blending process is essentially a physical process, the selection of any particular additive for use in the invention does not affect appreciably the results obtained in the practice of the invention.

As hereinbefore mentioned, all industrial pigments are available in particle sizes of substantially the same magnitude and, for the purposes of the invention, are considered to have substantially the same properties. The essential problem involved in the blending of pigment with the popcorn is of a physical nature. The selection of a particular color in the practice of the invention does not affect appreciably the results obtained from a physical standpoint. The amount of pigment employed in the practice of the invention is the amount usually employed in the preparation of molding compositions, and may range from as little as about 0.05 per cent to as much as about 5 per cent of the composition. The amount usually used in compositions having standard colors is about 0.5 per cent of the composition.

The amount of pigment employed in the preparation of a pigment concentrate of the invention may be varied within certain limits to suit the particular needs of a molding composition producer. In the preparation of a pigment concentrate, the amount of pigment used may vary from as little as 0.1 part of pigment per 100 parts of popcorn to as much as 100 parts of pigment per 100 parts of popcorn. Since it is not advantageous to carry out final blending using a pigment concentrate to preground popcorn weight ratio of more than 1:1, the minimum amount of a particular pigment that is used in a pigment concentrate should be at least twice the amount that is to be used in the final blend. Extremely low proportions of pigment are used only in pigment concentrates containing a pigment which is to be employed in very low proportions in the final molding composition; however, since the principal advantage of the invention resides in the unique manner in which the pigment concentrate is able to assist in blending the pigment into the final molding composition, the use of pigment concentrates containing substantially less than about 0.1 part of pigment per 100 parts of popcorn is not advantageous. At least about a 1:1 weight ratio of popcorn to pigment is necessary, however, in order to obtain sufficient pigment aggregate breakdown and dispersion in the pigment concentrate in order to obtain the advantages of the invention during final blending of the molding composition. The preferred popcorn to pigment weight ratio is from about 20:1 to about 5:1, and the optimum ratio is about 10:1.

As hereinbefore mentioned the pigment concentrate is a homogeneous blend of pigment and popcorn. In other words, during the preparation of a pigment concentrate the particular pigment (which may consist of one or more specific coloring materials such as those hereinbefore mentioned) is blended with the popcorn until a homogeneous blend is obtained. In the blending of solids, homogeneity is essentially a mathematical concept which can be shown symbolically. If pigment designated by the symbol "x" is to be blended with popcorn designated by the symbol "0" in a 1:1 ratio of 0's to x's, the symbolical representations of the mix before blending and after blending to obtain homogeneity are as follows:

| Before | After (Homogeneous Blend) |
|---|---|
| x x x 0 0 0<br>x x x 0 0 0<br>x x x 0 0 0 | x 0 x 0 x 0<br>0 x 0 x 0 x<br>x 0 x 0 x 0 |

If the popcorn to pigment (particle) ratio used is 3:1; then the symbolical representations would be as follows:

| Before | After (Homogeneous Blend) |
|---|---|
| x x x 0 0 0<br>0 0 0 0 0 0<br>x x x 0 0 0<br>0 0 0 0 0 0<br>x x x 0 0 0<br>0 0 0 0 0 0 | x 0 x 0 x 0<br>0 0 0 0 0 0<br>0 x 0 x 0 x<br>0 0 0 0 0 0<br>x 0 x 0 x 0<br>0 0 0 0 0 0 |

As a practical matter, of course, only substantial homogeneity can be obtained since perfect homogeneity is an impossibility. In the practice of the invention the homogeneity of a blend may be ascertained readily by the use of, for example, a microscopic examination wherein samples of the blend are examined to ascertain whether or not the average ratio of pigment particles to popcorn particles (in a given area) is the correct ratio for the proportion of pigment used.

Although the advantages obtained in the practice of the invention are of the same general character for the preparations of any amine-aldehyde molding composition, more substantial advantages may be obtained sometimes in the preparation of one particular composition than in the preparation of another such composition, usually because of slight variation in the grindability of the popcorn.

Various other embodiments of the invention may be devised to meet various requirements.

Having described the invention, I claim:

1. In the preparation of an amine-aldehyde molding composition from a dried filler impregnated with a heat-convertible amine-aldehyde condensate, an improved process of incorporating pigment therein which comprises the steps of (1) grinding dried impregnated filler to a powder and then (2) blending therewith a homogeneous mixture of 0.1–100 parts of pigment blended with 100 parts of dried impregnated filler ground to a powder.

2. In the preparation of an amine-aldehyde molding composition from a dried filler impregnated with a heat-convertible amine-aldehyde condensate, an improved process of incorporating pigment therein which comprises the steps of (1) blending a predetermined amount of said dried impregnated filler, preground to a powder, with a predetermined amount of pigment ranging from 0.1 to 100 weight per cent of the amount of preground impregnated filler and then (2) blending the pigmented powder of step (1), in predetermined proportions, with additional dried impregnated filler which has been ground to a powder.

3. A process of preparing commercial amine-aldehyde molding compositions, which comprises impregnating a fibrous filler with an aqueous solution of an amine-aldehyde condensate, drying the impregnated filler, grinding the dried impregnated filler to a powder, blending a predetermined portion of the powder with a predetermined amount of pigment ranging from 0.1 to 100 weight per cent of the powder portion and then blending the pigmented portion with the remaining portion of the powder.

4. In the preparation of an amine-aldehyde molding composition from a dried filler impregnated with a heat-convertible amine-aldehyde condensate, an improved process of incorporating pigment therein; which comprises the steps of (1) blending, in predetermined proportions, the pigment and the dried impregnated filler which has been ground to a powder, the amount of pigment being in the range from 0.1 to 100 per cent of the weight of the powder and then (2) blending the pigmented powder of step (1), in predetermined proportions, with additional dried impregnated filler which has been ground to a powder.

BURTON LOVE.

REFERENCES CITED

The following references are of record in the file of this patent:

UNITED STATES PATENTS

| Number | Name | Date |
|---|---|---|
| 2,520,100 | Morfit | Aug. 22, 1950 |